Jan. 17, 1956　　E. W. FRENCH ET AL　　2,731,238
LOCKING DEVICE FOR PLAY PEN RAILS
Filed July 13, 1954

INVENTOR
EARL W. FRENCH
WILLIAM B. KING

BY  *Herbert J. Jacobi*
ATTORNEY

United States Patent Office 2,731,238
Patented Jan. 17, 1956

2,731,238

LOCKING DEVICE FOR PLAY PEN RAILS

Earl W. French and William B. King, Memphis, Tenn.

Application July 13, 1954, Serial No. 442,944

3 Claims. (Cl. 256—26)

The invention relates to locking devices generally, and has for one of its objects to provide a type of locking device especially designed and constructed for use in locking the hinge connections between relatively swinging members, such as the foldable sections forming the sides of an infant's play-pen, in order to prevent accidental infolding of sections due to the movements of the infant while grasping the sections, which might possibly result in injury to the infant.

Another object of the invention is to provide a locking device to be mounted on the sides of adjacent ends of the horizontal rails of each pair of the foldable sections of a play-pen, opposite from the sides on which the connecting hinges are mounted, to extend across the joints between the adjacent rail ends; the device being pivoted for vertical swinging movements to one of the rail ends and adapted to detachably engage with a keeper mounted on the other adjacent rail end.

Still another object of the invention is to provide the locking device with a pair of horizontally spaced slotted depressions, of groove or channel form, to house the heads of screw fastenings, engaged with the slots, for preventing possible injury to the occupant of the play-pen, due to hand or body contact with the screw heads, which might otherwise occur were the screw heads not so housed; since it is well known that the edges of certain types of screw heads are not smooth but have sharp burrs that will cause injury; one of the screw fastenings constituting the pivot mounting for the device and the other the keeper.

Generally, the locking device comprises a flat elongated metal bar having one of the grooves or channels adjacent each of its ends with the one at the pivoted end of the bar being obliquely disposed with respect to the side edges of the bar and the other groove or channel perpendicular with respect to those edges; the one groove or channel having the slot formed in its bottom wall and extending parallel to its side walls and the other groove or channel also having the slot in its bottom wall and extending parallel to its side walls but opening through the lower edge of the bar for engagement with the shank of the keeper screw beneath the head thereof; the slot in the obliquely disposed groove or channel functioning with a cam-like action to tighten the bar into its operative relation with respect to the screws. A finger grip, to facilitate the swinging of the bar into and out of engagement of the open slot with the keeper screw, is formed by the outward prolongation of the outer side wall of the open slot which has its free end out-turned to give increased effectiveness to the grasp of the fingers during the manipulation of the bar.

With the foregoing and other objects and advantages of equal importance in view, the invention resides in the certain new and useful construction and arrangement of parts, as will be hereinafter more fully described, set forth in the appended claims, and illustrated in the accompanying drawing, in which:

Figure 2:
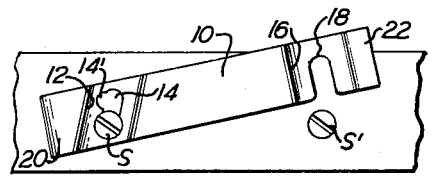
Fig. 2 is an enlarged side elevation of the locking device mounted on adjacent fragmentary end portions of the horizontal rails of the hinged side sections of the play-pen, the device being in unlocked state.
Figure 2:
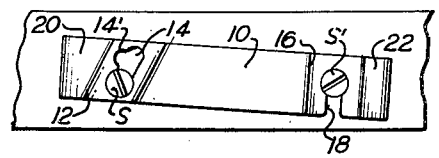
Figure 2:
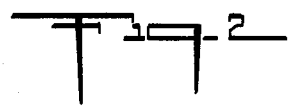
Figure 3:
Figure 4:
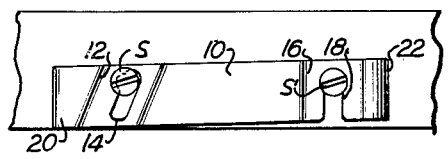
Figure 4:
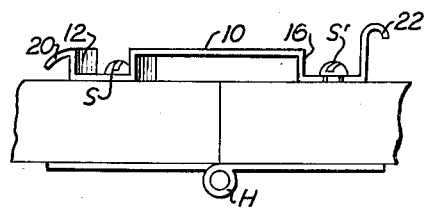
Figure 4:
Figure 5:

Fig. 3, a view similar to that of Fig. 2, but showing the device in partially locked position;

Fig. 4, another similar view to that of Figs. 2 and 3, but showing the device in its fully locked state; and Fig. 5 is an enlarged bottom plan view of the adjacent end portions of the rails, showing the relative positions of the hinge connection and the locking device, when the latter is in its fully locked state.

Figure 1:
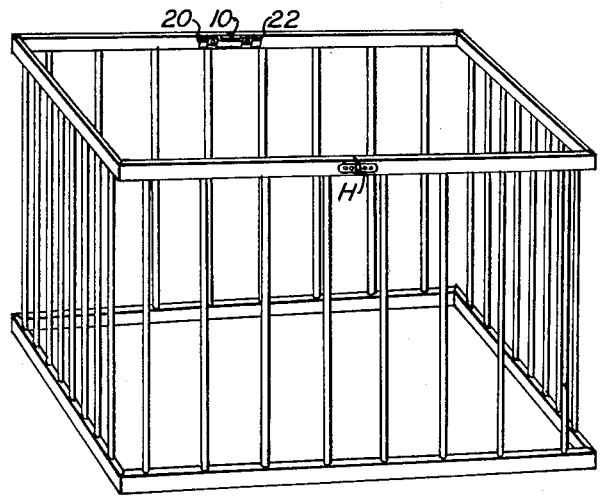
Fig. 1 is a perspective view of a play-pen, showing one of the locking devices mounted in operative relation with respect to a hinge connection between the adjacent ends of the top rails of the foldable sections forming a side of the play-pen.
Figure 1:

Referring to the drawing, H designates the hinge connecting the adjacent ends of the top rails of a pair of infolding sections forming a side of a play-pen which, as shown in Figs. 1 and 5, is usually mounted on the outer sides of the rails.

The locking device, which is to be mounted on the inner sides of the adjacent end portions of the top rails across the joint therebetween, comprises a flat elongated metal bar 10 having an oblique transverse groove or channel 12 depressed or otherwise formed therein adjacent one of its ends and a vertical transverse groove or channel 16 likewise formed in the same adjacent its opposite end; the two grooves or channels each having a slot in the bottom wall and extending parallel to the side walls thereof, the slot in the groove or channel 12 being indicated at 14 and the slot in the groove or channel 16 being indicated at 18. The slot 14 is closed at its ends and is engaged by a screw S which functions as a pivot for the bar 10, while the slot 18 opens at its lower end through the lower edge of the bottom wall of the groove or channel 16 for engagement with the shank of a second screw S', when the bar is swung on the pivot screw S into nearly parallel relation with respect to the top and bottom edges of the rails of the hinged side sections. In this position of the bar 10, the slot 18 will be engaged with the shank of the screw S', which functions as a keeper and by now depressing the pivoted end of the bar, the slot 14 will exert a cam-like action against the screws to clamp the bar in place on the two screws, and the bar will now be disposed in substantially parallel relation with respect to the top and bottom edges of the coupled rails. The slot 14 is provided with a recess 14' at one end thereof to receive the screw S and prevent inadvertent movement of the bar 10.

The outer side wall of the groove or channel 12, of the bar 10, is somewhat elongated and curved outwardly and downturned, as at 20, and the outer side wall of the groove or channel 16 is elongated to a somewhat greater length and has its free end portion out-turned, as at 22, to provide a finger grip by means of which the manipulation of the bar into and from operative locked position is facilitated.

Thus, it will be apparent that, with a locking device installed in association with the hinge connection between the infoldable sections at each side of the play-pen as stated, the sections are securely coupled and the hinges are rendered ineffective to allow of any infolding movement of the coupled sections, regardless of the actions of the occupant relative thereto.

Having thus fully described a preferred embodiment of our invention, it will be understood that the words which we have used are words of description and not of limitation, and that changes may be made in the same within the purview of the appended claims, without departing from the true scope and spirit of the invention in its broader aspects.

What is claimed is:

1. In a locking device, a flat elongated metal bar bridging the joint between a pair of members hinged together in end-to-end relation for relative swinging movements in one direction only, said bar having a slot formed adjacent one end and extending perpendicular with respect to the side edges of the bar and opening through the lower of said edges, said bar having a second slot formed adjacent the other of its ends and extending obliquely with respect to said side edges, pivot means carried by one of said members and engaged with said second slot, a keeper carried by the other of said members to be engaged by the first slot and to hold said members in alignment, said second slot having a cam-like action to tighten the slots into engagement with said pivot means and said keeper when the latter is engaged by the first slot, said bar being positioned on the sides of said members opposite from the sides on which the hinge is mounted.

2. In a locking device, a flat elongated metal bar bridging the joint between a pair of members hinged together in end-to-end relation for relative swinging movements in one direction only, said bar having a channel formed adjacent each of its ends, one of said channels extending obliquely with respect to the side edges of the bar and the other channel extending perpendicular to said edges, said one channel having a closed slot formed in its bottom wall and extending parallel to its side walls, said other channel having a second slot formed in its bottom wall and extending parallel to its side walls, said second slot opening through the lower side edge of the bar, a headed screw carried by one of said members and engaged by the first slot, a second headed screw carried by the other of said members and detachably engaged by said second slot, the first slot functioning with a cam-like action against the shank of the first screw to tighten the bar relative to the screws, and a finger grip formed by an angled extension of the outer side wall of said other channel.

3. A locking device as defined in claim 2 in which said closed slot is provided with a recess adjacent one end thereof, said first screw engaging said reces to lock said bar in clamping position.

References Cited in the file of this patent

UNITED STATES PATENTS

| | | |
|---|---|---|
| 610,739 | Greene | Sept. 13, 1898 |
| 1,071,283 | Weaver | Aug. 26, 1913 |
| 2,686,042 | Hendricks et al. | Aug. 10, 1954 |